(12) United States Patent
Pyo et al.

(10) Patent No.: US 11,309,576 B2
(45) Date of Patent: Apr. 19, 2022

(54) ELECTRODE ASSEMBLY AND METHOD FOR MANUFACTURING THE SAME

(71) Applicant: LG Chem, Ltd., Seoul (KR)

(72) Inventors: Jung Kwan Pyo, Daejeon (KR); Cha Hun Ku, Daejeon (KR); Su Taek Jung, Daejeon (KR); Seok Jin Kim, Daejeon (KR); Tai Jin Jung, Daejeon (KR)

(73) Assignee: LG Energy Solution, Ltd.

( * ) Notice: Subject to any disclaimer, the term of this patent is extended or adjusted under 35 U.S.C. 154(b) by 0 days.

(21) Appl. No.: 16/612,908

(22) PCT Filed: Nov. 16, 2018

(86) PCT No.: PCT/KR2018/014119
§ 371 (c)(1),
(2) Date: Nov. 13, 2019

(87) PCT Pub. No.: WO2019/151626
PCT Pub. Date: Aug. 8, 2019

(65) Prior Publication Data
US 2020/0168941 A1 May 28, 2020

(30) Foreign Application Priority Data
Feb. 1, 2018 (KR) ........................ 10-2018-0012994

(51) Int. Cl.
*H01M 10/04* (2006.01)
*H01M 50/46* (2021.01)
*H01M 50/403* (2021.01)

(52) U.S. Cl.
CPC ..... *H01M 10/0459* (2013.01); *H01M 50/403* (2021.01); *H01M 50/46* (2021.01)

(58) Field of Classification Search
CPC ................................................ H01M 10/0459
See application file for complete search history.

(56) References Cited

U.S. PATENT DOCUMENTS

| 2011/0305938 A1 | 12/2011 | Yamamoto et al. |
| 2012/0189894 A1* | 7/2012 | Ahn ................ H01M 10/0459 |
| | | 429/135 |

(Continued)

FOREIGN PATENT DOCUMENTS

| CN | 109643820 A | 4/2019 |
| JP | 2008192432 A | 8/2008 |

(Continued)

OTHER PUBLICATIONS

International Search Report from Application No. PCT/KR2018/014119 dated Feb. 25, 2019, 2 pages.

(Continued)

*Primary Examiner* — Matthew T Martin
*Assistant Examiner* — Jessie L. Walls
(74) *Attorney, Agent, or Firm* — Lerner, David, Littenberg, Krumholz & Mentlik, LLP

(57) ABSTRACT

The present invention provides a method for manufacturing an electrode assembly, comprising: interposing a plurality of first electrodes one by one, which are spaced apart from each other, between two separators; stacking a second electrode on each of outer surfaces of the separators on each of both sides of the first electrode at positions that are skipped by one of the plurality of positions on which the first electrodes are disposed to alternately continuously form a bi-cell, in which the second electrode/the separator/the first electrode/the separator/the second electrode are sequentially stacked, and a half-cell, in which the separator/the first electrode/the separator are sequentially stacked; cutting the stack into a unit cell in which one bi-cell and one half-cell are connected to each other; folding the unit cell so that the bi-cell and the half-cell are stacked; and stacking a plurality of folded unit cells to manufacture the electrode assembly.

7 Claims, 11 Drawing Sheets

(56) References Cited

U.S. PATENT DOCUMENTS

| | | |
|---|---|---|
| 2012/0196167 A1 | 8/2012 | Kim et al. |
| 2014/0363727 A1* | 12/2014 | Ko .................... H01M 10/0472 |
| | | 429/149 |
| 2015/0033547 A1 | 2/2015 | Yang et al. |
| 2017/0338509 A1 | 11/2017 | Cho et al. |
| 2019/0237797 A1 | 8/2019 | Cho et al. |

FOREIGN PATENT DOCUMENTS

| | | |
|---|---|---|
| JP | 2017157346 A | 9/2017 |
| KR | 20110037781 A | 4/2011 |
| KR | 20130126208 A | 11/2013 |
| KR | 20140062568 A | 5/2014 |
| KR | 20160132566 A | 11/2016 |
| KR | 20160133243 A | 11/2016 |
| KR | 20170110364 A | 10/2017 |
| KR | 20180001458 A | 1/2018 |
| KR | 20180037847 A | 4/2018 |

OTHER PUBLICATIONS

Extended European Search Report for Application No. 18903677.5 dated Jul. 14, 2020, 8 pages.

\* cited by examiner ical Patent Application No. PCT/
ELECTRODE ASSEMBLY AND METHOD FOR MANUFACTURING THE SAME

CROSS-REFERENCE TO RELATED APPLICATION

The present application is a national phase entry under 35 U.S.C. § 371 of International Patent Application No. PCT/KR2018/014119, filed on Nov. 16, 2018, published in Korean, which claims priority from Korean Patent Application No. 10-2018-0012994, filed on Feb. 1, 2018, the disclosures of which are hereby incorporated herein by reference in their entireties.

TECHNICAL FIELD

The present invention relates to an electrode assembly and a method for manufacturing the same, and more particularly, to an electrode assembly which is capable of improving an alignment of a secondary battery, realizing a high capacity battery, and reducing a loss ratio when defects occur, and a method for manufacturing the same.

BACKGROUND ART

Secondary batteries are rechargeable unlike primarily batteries, and also, the possibility of compact size and high capacity is high. Thus, recently, many studies on rechargeable batteries are being carried out. As technology development and demands for mobile devices increase, the demands for rechargeable batteries as energy sources are rapidly increasing.

Such a secondary battery is configured so that an electrode assembly is built in a battery case (for example, a pouch, a can, and the like). The electrode assembly built in the battery case is repeatedly chargeable and dischargeable because of a structure in which a positive electrode/a separator/a negative electrode are stacked.

FIG. 1A is a side view illustrating a process of manufacturing an electrode assembly through a stack & folding process among the electrode assembles according to the related art.

Referring to FIG. 1, the stack & folding type electrode assembly has a structure in which a plurality of unit cells 4, in which a positive electrode 1, a separator 3, and a negative electrode 2 are sequentially stacked, are seated on a sheet type separator 5, and the sheet type separator 5 is folded in one direction L.

The stack & folding type electrode assembly having the above-described structure according to the related art has an advantage that stability is relatively improved as compared with other structures, but there are disadvantages as well.

First, in the stack & folding type electrode assembly 11 according to the related art, the positive electrode 1, the separator 3, and the negative electrode 2 are stacked and then cut into radical units to form individual unit cells. Then, the unit cells 4 are attached to the sheet type separator 5 to perform a folding process. Thus, the process of manufacturing the electrode assembly may be complicated.

Also, in the process of manufacturing the unit cell 4, tolerances generated in each of the positive electrode 1, the negative electrode 2, and the separator 3 may be accumulated. Then, when the unit cell 4 is folded in the next process, a tolerance between the unit cells while the folding and the stacking may be accumulated again to significantly cause an overhang issue in which the positive electrode 1 is out of alignment of the negative electrode 2.

Such an overhanging A may increase as the number of stacked unit cells 4 increases (i.e., the number of times of folding increases). That is, in this process, when the number of stacked electrodes constituting the unit cell 4 increases, the number of times of folding may decrease to reduce the number of times of folding. However, when the number of stacked electrodes constituting the unit cell 4 increases, it is difficult to align the electrodes when folding.

Also, FIG. 1B is a side view illustrating a stacked shape of an electrode assembly manufactured through a lamination & stacking process. As illustrated in FIG. 1B, in the lamination & stacking process, unit cells, each of which is manufactured by laminating a positive electrode 1, a separator 3, a negative electrode 2, and a separator 3, are aligned by an outer dimension of the separator 3. In this case, the overhang issue may also occur. That is, the individual tolerances of the plurality of electrodes 1 and 2 and the plurality of separators 3 may be accumulated while manufacturing the unit cells, and the tolerance between the unit cells may also be accumulated to cause the overhang issue in which the positive electrode 1 is out of the negative electrode 2. FIG. 1B illustrates an overhang area A that is an area in which the positive electrode 1 is out of the negative electrode 2.

Furthermore, in order to solve the above problems, the applicant has filed a patent application (Korean Patent Application No. 10-2016-0128583) filed on Oct. 10, 2016, entitled "Electrode Assembly and Method for Manufacturing The same", in which negative electrodes are disposed at a predetermined interval between two separators, and a positive electrode is disposed on both surfaces at every other of the negative electrode so as to be stacked in the form of a zigzag. However, the zigzag-stacked structure has been effective in reducing the overhang issue, but there has been a problem in that if a position defect occurs even at one electrode, the entire cell is defective.

DISCLOSURE OF THE INVENTION

Technical Problem

Accordingly, to solve the above problem, a main object of the present invention is to provide an electrode assembly and a method for manufacturing the same.

Technical Solution

To achieve above object, the present invention provides a method for manufacturing an electrode assembly, the method comprising: interposing a plurality of first electrodes between two separators, the first electrodes being spaced apart from each other along inner surfaces of the separators; stacking a plurality of second electrodes on outer surfaces of the two separators adjacent to top and bottom sides of every other one of the first electrodes, each of the every other one of the first electrodes, the respective ones of the second electrodes adjacent thereto, and first corresponding portions of the two separators forming a respective bi-cell, and each of remaining ones of the first electrodes and second corresponding portions of the two separators forming a respective half-cell; cutting the stack into a plurality of unit cells, each of the unit cells comprising a corresponding one of the bi-cells and an adjacent one of the half-cells connected to each other; folding each of the unit cells so that the respective bi-cell and the respective half-cell are stacked with one another; and stacking a plurality of the folded unit cells with one another to form the electrode assembly.

The method may further comprise performing a first sealing comprising adhering edge portions of the separators of each of the unit cells to each other before each of the unit cells are folded.

The method may further comprise performing a second sealing comprising adhering the edge portions of the separators of each of the unit cells to each other after each of the unit cells are folded.

For each of the unit cells, second locations of the separators at which the second sealing is performed may partially overlap first locations of the separators at which the first sealing is performed.

The first sealing and the second sealing may be performed by applying heat and a pressure to the edge portions of the separators of each of the unit cells so that the edge portions of the separators of each of the unit cells adhere to each other.

When the folded unit cells are stacked with one another, folding parts of each of the unit cells that are portions folded by connecting the respective bi-cell to the respective half-cell may be aligned with one another in a vertical direction of the electrode assembly.

When the folded unit cells are stacked with one another, a folding part of each of a first half of the unit cells may face in a first lateral direction, and a folding part of each of a second half of the unit cells may face in a second lateral direction, the first half of the unit cells being interleaved with the second half of the unit cells in the stacked electrode assembly, each folding part being a portion folded by connecting the respective bi-cell to the respective half-cell in the respective unit cell.

Each of the first electrodes of each of the unit cells may have an area equal to or greater than that of each of the second electrodes of each of the unit cells, and each of the first electrodes may be a negative electrode, and each of the second electrodes may be a positive electrode.

Therefore, the present may also provide a method for manufacturing a secondary battery, which comprises the method for manufacturing the electrode assembly as described above. That is, a method for manufacturing a secondary battery, which comprises a step of manufacturing an electrode assembly and a step of building the electrode in a case, wherein the method for manufacturing the electrode assembly provided according to the present invention may be applied to the method for manufacturing the electrode assembly.

Furthermore, the present invention may additionally provide an electrode assembly. The electrode assembly according to the present invention has a plurality of folded unit cells, each folded unit cell having a bi-cell and a half-cell stacked with one another, each of the folded unit cells being stacked with one another in a vertical direction of the electrode assembly.

Within each of the folded unit cells, two folded separators may extend along opposite respective sides of a first electrode of each of the half-cell and the bi-cell, the two folded separators being adhered to each other at opposite edge portions thereof to prevent the half-cell and the bi-cell from moving relative to one another. Adjacent ones of the folded unit cells that are stacked with each other in the vertical direction may adhere to each other at one or more locations.

Advantageous Effects

The electrode assembly having the above configuration according to the present invention may reduce the possibility of occurrence of the overhang according to the related art because the unit cell is provided in the state in which the half-cell and the bi-cell are connected to each other. Also, since the unit cells are folded one by one, it may be possible to solve the problem in which the entire electrode assembly has to be discarded when the defect occurs (more specifically, the problem of the structure disclosed in Korean Patent Application No. 10-2016-0128583).

Furthermore, in the present invention, the first sealing ad/or the second sealing of the unit cell may be performed to more effectively prevent the electrode from moving, thereby coping with the overhang issue.

MODE FOR CARRYING OUT THE INVENTION

Figure 1A:
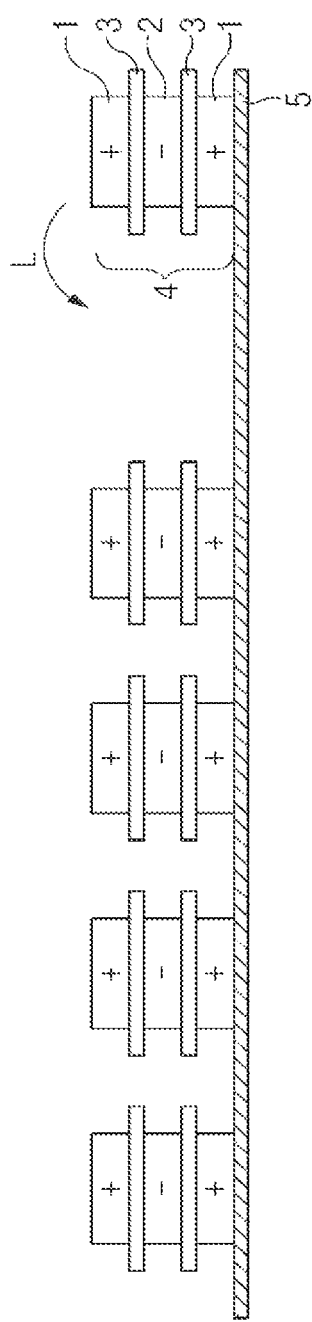
FIG. 1A is side view illustrating a process of manufacturing an electrode assembly through a stack & folding process.
Figure 1B:
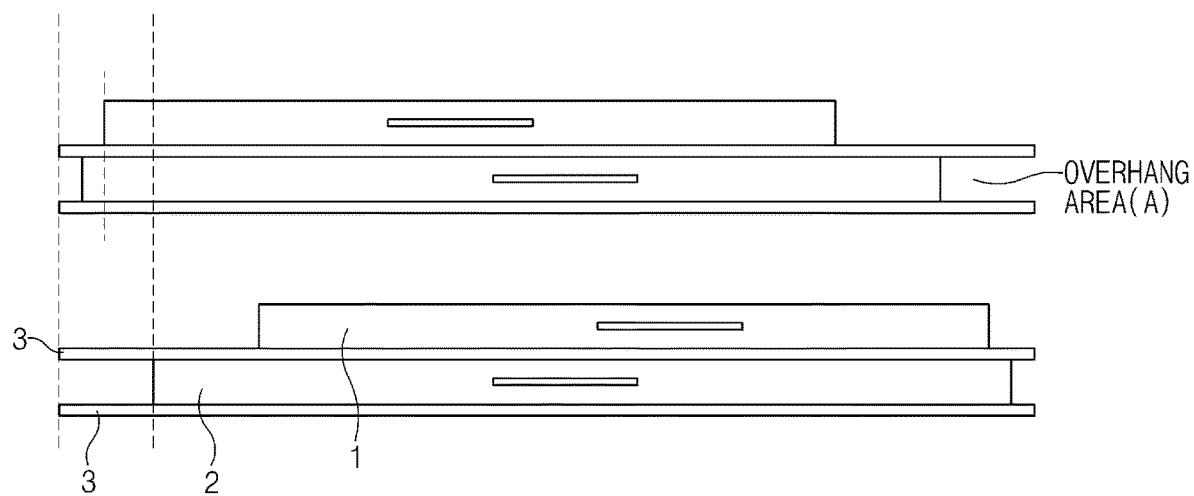
FIG. 1B is a side view illustrating a process of manufacturing an electrode assembly through a lamination & stacking process.

Hereinafter, preferred embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein.

In order to clearly illustrate the present invention, parts that are not related to the description are omitted, and the same or similar components are denoted by the same reference numerals throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

The present invention relates to a method for manufacturing an electrode assembly, which solves an overhang issue and reduces a loss ratio due to defects, and an electrode manufactured through the manufacturing method, and a method for manufacturing a secondary battery, which comprises the manufacturing method, is additionally provided. Hereinafter, embodiments according to the present invention will be described in more detail with reference to the accompanying drawings.

Embodiment 1

Figure 2A:
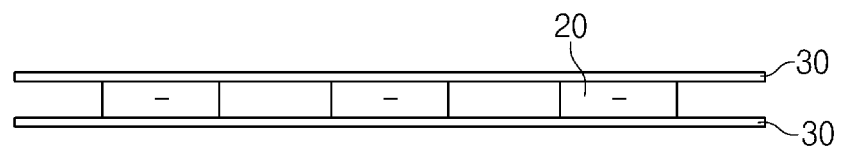
FIG. 2A is a side view illustrating a state in which negative electrodes are disposed at a predetermined interval between two separators according to an embodiment of the present invention.
Figure 2B:
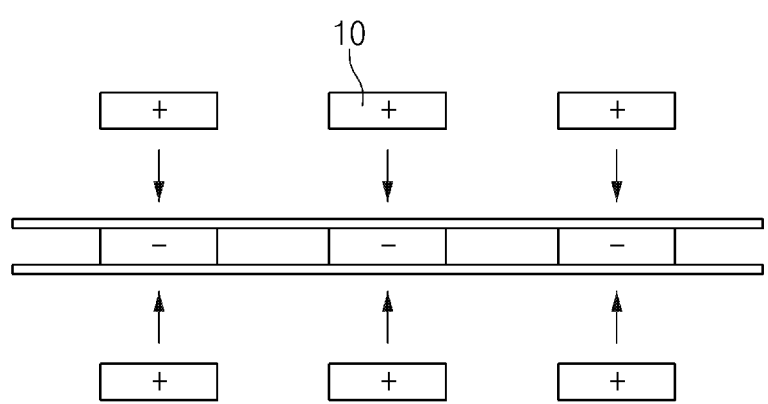
FIG. 2B is a side view illustrating a state in which a positive electrode is attached to each of both surfaces of the negative electrodes, which are spaced one by one at a predetermined interval in the state of FIG. 2A.
Figure 2C:
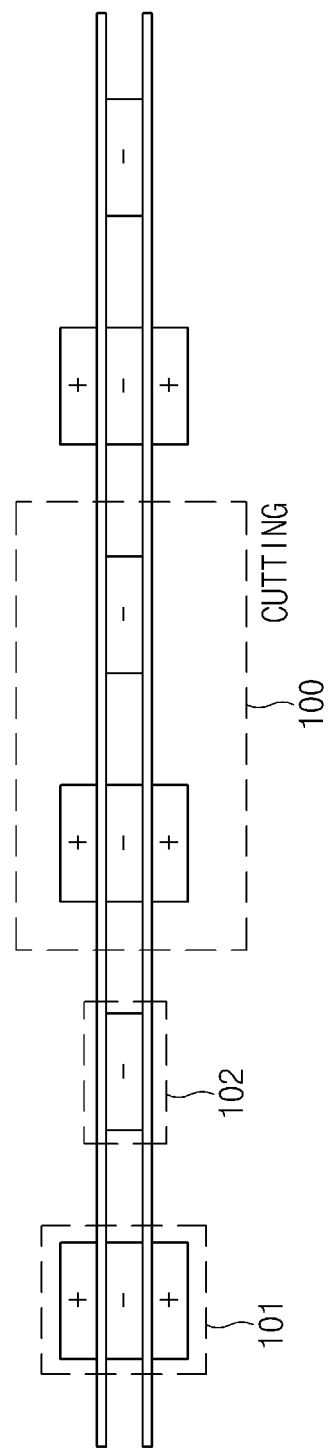
FIG. 2C is a side view illustrating a state in which a positive electrode is attached in the state of FIG. 2B.

FIG. 2A is a side view illustrating a state in which negative electrodes 20 are disposed at a predetermined interval between two separators 30 according to an embodiment of the present invention, FIG. 2B is a side view illustrating a state in which a positive electrode 10 is attached to each of both surfaces of the negative electrodes 20, which are spaced one by one at a predetermined interval in the state of FIG. 2A, and FIG. 2C is a side view illustrating a state in which a positive electrode 10 is attached in the state of FIG. 2B.

Referring to the drawings, the manufacturing method according to the present invention is started from a step of interposing a plurality of first electrodes one by one, which are spaced apart from each other, between two separators 30.

Although the first electrode is the positive electrode 10 in the present invention, it is preferable that the first electrode is the negative electrode 20. Also, a distance between the negative electrodes 20 adjacent to each other may be determined according to a thickness of each of the negative electrodes 20, a thickness of each of the separators 30, conditions required for folding, and the like.

Also, as illustrated in FIG. 2B, a second electrode, which is the positive electrode 10, is stacked on each of outer surfaces of the separators 30 on each of both sides of the first electrode at positions that are skipped by one of the plurality of positions on which the first electrodes are disposed.

Thus, as illustrated in FIG. 2C, a bi-cell 101 in which the positive electrode/the separator/the negative electrode/the separator/the positive electrode are sequentially stacked and a half-cell 102 in which the separator/the negative electrode/the separator are sequentially stacked are alternately disposed to be continuous.

Figure 3:
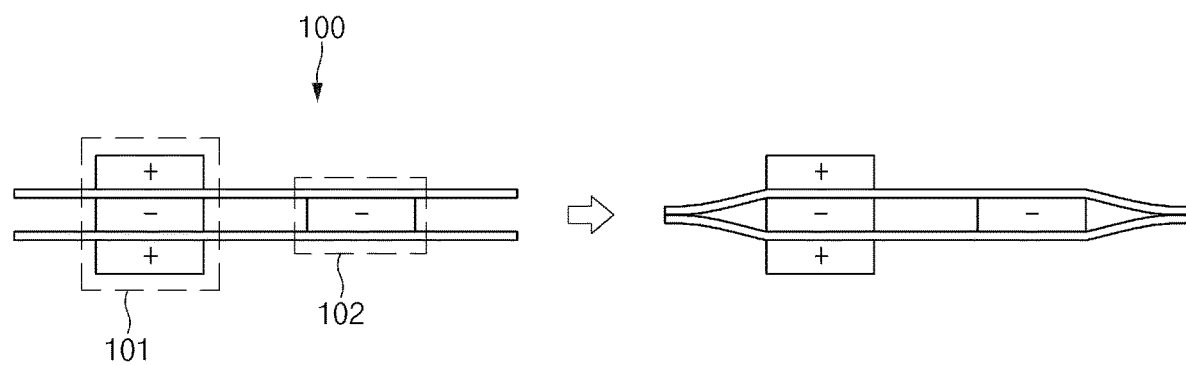
FIG. 3 is a side view illustrating a unit cell in which one bi-cell and one half-cell are connected to each other and a state in which first sealing is performed on each of both ends of the unit cell.

Also, the stack is cut into a unit cell 100 in which one bi-cell 101 and one half-cell 102 are connected to each other. Here, since the cut unit cell 100 is in a state in which the separators 30 are spread from each other at both ends thereof, first sealing (primary sealing) is performed between the separators 30 at an edge portion thereof to seal the edge portion as illustrated in FIG. 3.

Since the first sealing is performed in a state in which the unit cell 100 is vertically symmetrical with respect to a virtual center line (which will pass through a center of the negative electrode), bending and/or deformation of the unit cell 100 may be suppressed under high-temperature and high-pressure conditions, which occur during a production process of the secondary battery, which will be performed later.

Figure 4:
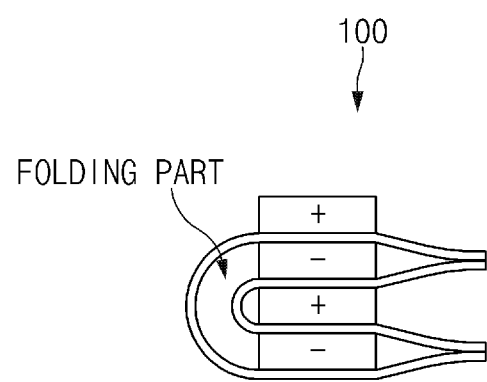
FIG. 4 is a side view illustrating a state in which the unit cell is folded.

After the first sealing is performed, the unit cell 100 is folded so that the half-cell 102 and the bi-cell 101 are stacked as illustrated in FIG. 4.

Figure 5A:
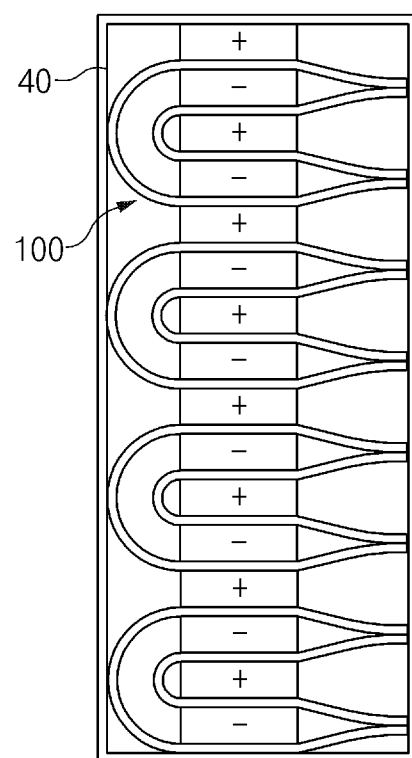
FIG. 5A is a view illustrating a state in which a plurality of unit cells are stacked in a state of being arranged in the same direction.
Figure 5B:
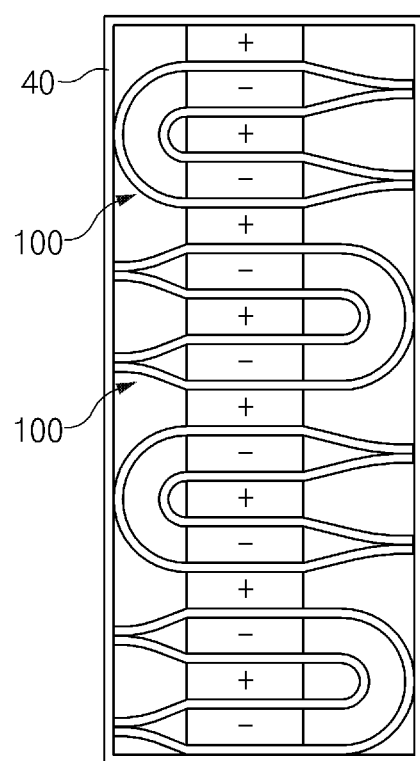
FIG. 5B is a view illustrating a state in which a folding part of the unit cell disposed on at n-th layer (where n is an odd number) and a folding part of the unit cell disposed at an (n+1)-th layer are stacked in a state in which the folding parts are disposed at opposite sides.

A plurality of folded unit cells 100 may be stacked to constitute an electrode assembly. As illustrated in FIGS. 5A and 5B, the electrode assembly may be manufactured so that the stack is supported by a separate folding separator 40. Alternatively, top and bottom surfaces of each of the unit cells 100 may adhere to each other so as to be stacked without the separate folding separator 40.

Also, as illustrated in FIG. 5A, the unit cells 100 may be stacked so that folding parts that are portions folded by connecting the bi-cell 101 to the half-cell 102 are disposed in the same direction. Alternatively, as illustrated in FIG. 5B, a folding part of the unit cell disposed at an n-th layer (where n is a natural number of 1 or more) and a folding part of the unit cell disposed at an (n+1)-th layer are stacked to face directions opposite to each other. This may be an option depending on product specifications, but the latter may be a more useful structure to align both sides so as to match heights of both the sides.

Figure 6A:
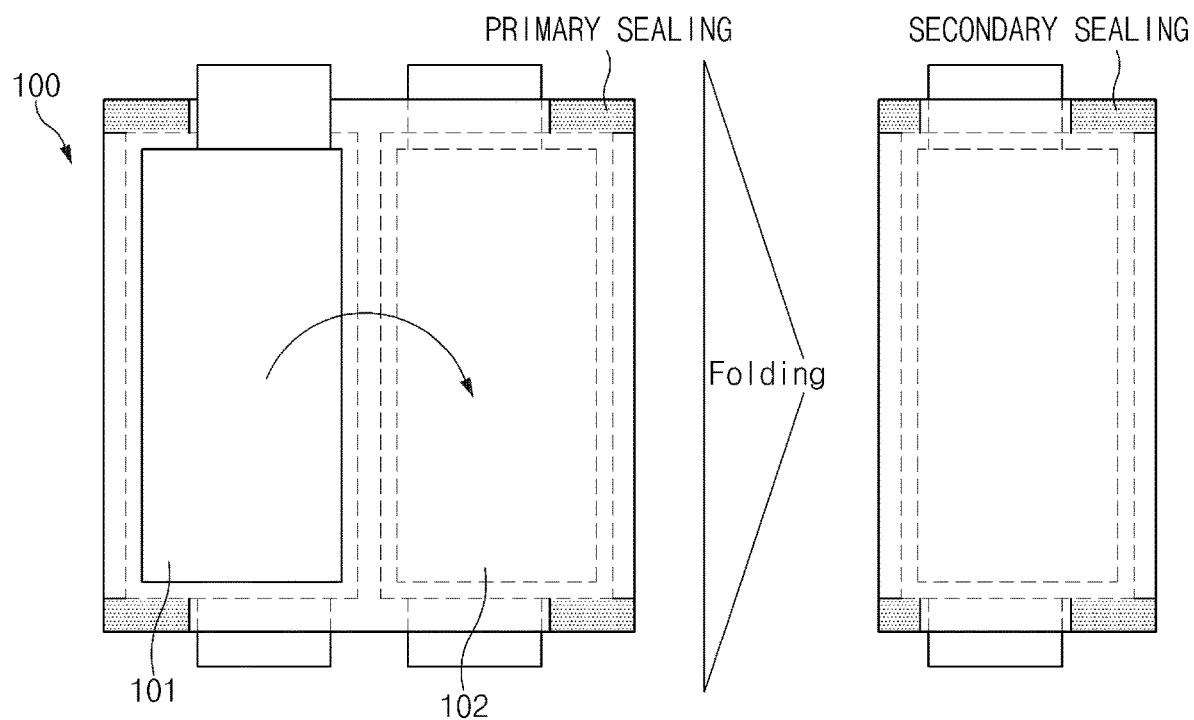
FIG. 6A is a plan view illustrating states before and after the unit cell is folded and illustrates points at which primary sealing and secondary sealing are performed.

Furthermore, according to the present invention, the first sealing may be performed to prevent the separator 30 and the electrodes (the negative electrode and the positive electrode) from moving as described above. In addition, second sealing (secondary sealing) may be additionally performed to fix the fixed state of the unit cell 100. That is, as illustrated in FIG. 6A, the first primary sealing may be performed between the separators 300 at each of the edge portions of the unit cell 100 (having a rectangular shape when viewed from upper and lower sides) before the folding, and then, the secondary sealing may be performed after the folding. As illustrated in the drawing, since the secondary sealing is performed on a position at which an edge portion of the bi-cell 101 and an edge portion of the half-cell 102 contact each other, the point at which the secondary sealing is performed may at least partially overlap the point at which the primary sealing is performed.

Here, since the separator 30 according to the present invention is made of a material containing a polymer material that generates adhesive force when heat is applied thereto, the first sealing and the second sealing may be performed by applying heat and a pressure.

Since both ends of the manufactured unit cell 100 on which the second sealing is performed are fixed without moving, the unit cells 100 may be more stably stacked.

For reference, according to the present invention as described above, the first electrode is the negative electrode 20, and the second electrode is the positive electrode 10, and the first electrode may have an area equal to or greater than that of the second electrode.

The method for manufacturing the secondary battery in which the electrode assembly is built comprises 'a step of manufacturing an electrode assembly' and 'a step of building the electrode assembly in a pouch (a case)'. Thus, since the present invention provides the method for manufacturing the electrode assembly as 'the step of manufacturing the electrode assembly' of the method for manufacturing the secondary battery, the method for manufacturing the secondary battery may be additionally provided. The method for manufacturing the secondary battery is the same as the method for manufacturing the electrode assembly described above, and thus, its additional explanation will be omitted.

Embodiment 2

The present invention additionally provides an electrode assembly manufactured by continuously stacking a negative electrode 20, a separator 30, and a positive electrode 10.

Figure 6B:
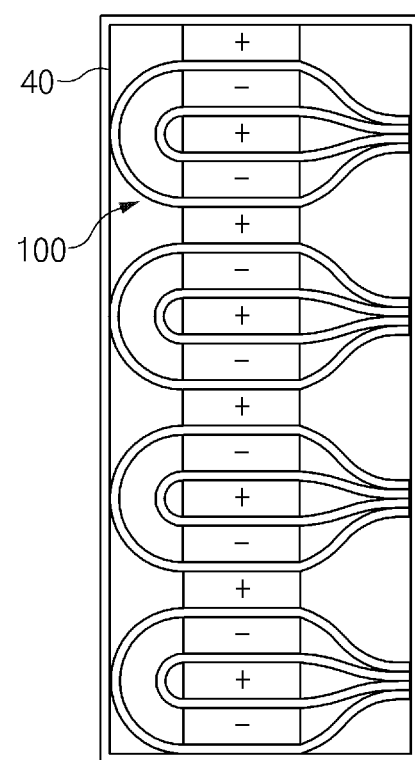
FIG. 6B is a view illustrating a state in which unit cells on which the secondary sealing is performed are stacked.

As illustrated in FIGS. 5A, 5B, and 6B, the electrode assembly according to the present invention is manufactured by stacking a plurality of unit cells 100. Each of the unit cells 100 has a structure that is folded in a state in which a bi-cell 101 and a half-cell 102 are connected to each other.

That is, as illustrated in FIG. 3, the unit cell 100 according to the present invention has a structure in which one bi-cell 101 and one half-cell 102 are connected to each other. The bi-cell may have a structure in which the positive electrode 10 is additionally stacked on each of both surfaces of the half-cell 102. Thus, the bi-cell 101 may have a structure in which the positive electrode/the separator/the negative electrode/the separator are sequentially stacked, and the half-cell 102 has a structure in which the separator/the negative electrode/the separator are sequentially stacked. Also, as illustrated in FIG. 4, the unit cell 100 is folded so that the half-cell 102 and the bi-cell 101 are stacked. Also, primary sealing and secondary sealing may be performed to prevent movement of the electrode and the folded state. For reference, although a state in which the primary sealing and the secondary sealing are performed on only a portion of an edge of the separator 30 is illustrated in FIG. 6A, the primary sealing and the secondary sealing may be entirely performed along a circumference of the separator 30. Alternatively, sealing using an adhesive as well as the sealing through the heat and pressure as described above may be possible.

The electrode assembly having the above configuration according to the present invention may constitute the unit cell 100 in the state in which the half-cell 102 and the bi-cell 101 are connected to each other to reduce possibility of occurrence of the overhang according to the related art. Also, since the unit cells are folded one by one, it may be possible to solve the problem in which the entire electrode assembly has to be discarded when the defect occurs.

Furthermore, in the present invention, the first sealing ad/or the second sealing of the unit cell 100 may be performed to more effectively prevent the electrode from moving, thereby coping with the overhang issue.

While the embodiments of the present invention have been described with reference to the specific embodiments, it will be apparent to those skilled in the art that various changes and modifications may be made without departing from the spirit and scope of the invention as defined in the following claims.

The invention claimed is:

1. A method for manufacturing an electrode assembly, the method comprising:
   interposing a plurality of first electrodes between two separators, the first electrodes being spaced apart from each other along inner surfaces of the separators;
   stacking a plurality of second electrodes on outer surfaces of the two separators adjacent to top and bottom sides of every other one of the first electrodes, each of the every other one of the first electrodes, the respective ones of the second electrodes adjacent thereto, and first corresponding portions of the two separators forming a respective bi-cell, and each of remaining ones of the first electrodes and second corresponding portions of the two separators forming a respective half-cell;
   cutting the stack into a plurality of unit cells, each of the unit cells comprising a corresponding one of the bi-cells and an adjacent one of the half-cells connected to each other, such that within each of the unit cells, the two separators extend along opposite respective sides of a first electrode of each of the half-cell and the bi-cell;
   folding each of the unit cells so that the respective bi-cell and the respective half-cell are stacked with one another;
   stacking a plurality of the folded unit cells with one another to form the electrode assembly;
   performing a first sealing comprising adhering edge portions of the separators of each of the unit cells to each other before each of the unit cells are folded, such that within each of the unit cells, the two separators are adhered to each other at opposite edge portions thereof to prevent the half-cell and the bi-cell from moving relative to one another; and
   performing a second sealing comprising adhering the edge portions of the separators of each of the unit cells to each other after each of the unit cells are folded.

2. The method of claim 1, wherein, for each of the unit cells, second locations of the separators at which the second sealing is performed partially overlaps first locations of the separators at which the first sealing is performed.

3. The method of claim 1, wherein the first sealing and the second sealing are performed by applying heat and a pressure to the edge portions of the separators of each of the unit cells so that the edge portions of the separators of each of the unit cells adhere to each other.

4. The method of claim 1, wherein, when the folded unit cells are stacked with one another, folding parts of each of the unit cells that are portions folded by connecting the respective bi-cell to the respective half-cell are aligned with one another in a vertical direction of the electrode assembly.

5. The method of claim 1, wherein, when the folded unit cells are stacked with one another, a folding part of each of a first half of the unit cells faces in a first lateral direction, and a folding part of each of a second half of the unit cells faces in a second lateral direction, the first half of the unit cells being interleaved with the second half of the unit cells in the stacked electrode assembly, each folding part being a portion folded by connecting the respective bi-cell to the respective half-cell in the respective unit cell.

6. The method of claim 1, wherein each of the first electrodes of each of the unit cells has an area equal to or greater than that of each of the second electrodes of each of the unit cells, and
   each of the first electrodes is a negative electrode, and each of the second electrodes is a positive electrode.

7. A method for manufacturing a secondary battery, which comprises manufacturing an electrode assembly and installing the electrode assembly into a case, the manufacturing of the electrode assembly comprising:
   interposing a plurality of first electrodes between two separators, the first electrodes being spaced apart from each other along inner surfaces of the separators;
   stacking a plurality of second electrodes on outer surfaces of the two separators adjacent to top and bottom sides of every other one of the first electrodes, each of the every other one of the first electrodes, the respective ones of the second electrodes adjacent thereto, and first corresponding portions of the two separators forming a respective bi-cell, and each of remaining ones of the first electrodes and second corresponding portions of the two separators forming a respective half-cell;
   cutting the stack into a plurality of unit cells, each of the unit cells comprising a corresponding one of the bi-cells and an adjacent one of the half-cells connected to each other, such that within each of the unit cells, the two separators extend along opposite respective sides of a first electrode of each of the half-cell and the bi-cell;

folding each of the unit cells so that the respective bi-cell and the respective half-cell are stacked with one another;

stacking a plurality of the folded unit cells with one another to form the electrode assembly;

performing a first sealing comprising adhering edge portions of the separators of each of the unit cells to each other before each of the unit cells are folded, such that within each of the unit cells, the two separators are adhered to each other at opposite edge portions thereof to prevent the half-cell and the bi-cell from moving relative to one another; and performing a second sealing comprising adhering the edge portions of the separators of each of the unit cells to each other after each of the unit cells are folded.

* * * * *